July 1, 1952     R. E. SLY     2,601,999
FOLDABLE GAFF HOOK
Filed March 12, 1948     2 SHEETS—SHEET 1
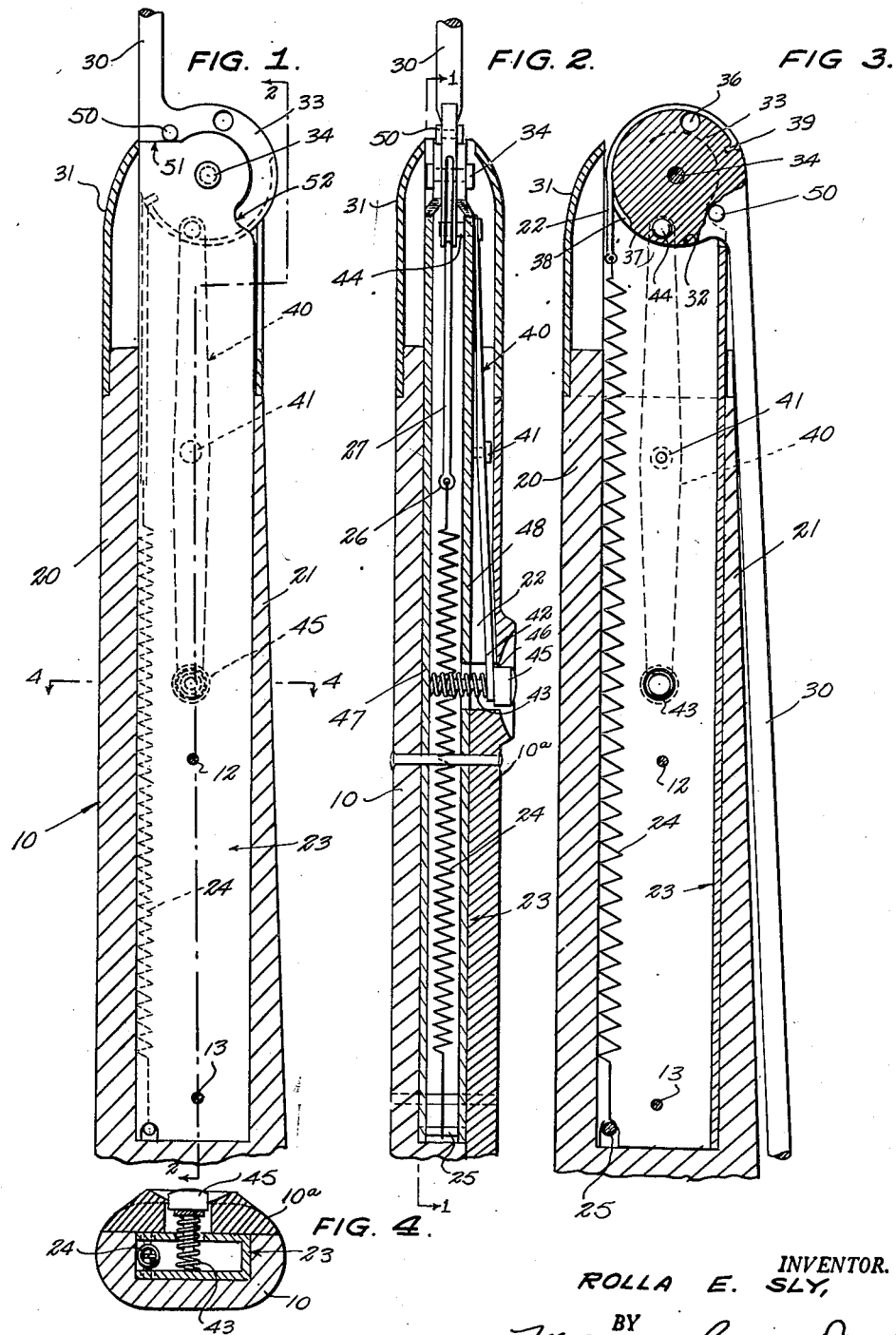
INVENTOR.
ROLLA E. SLY,
BY McMorrow, German & Davidson
ATTORNEYS.

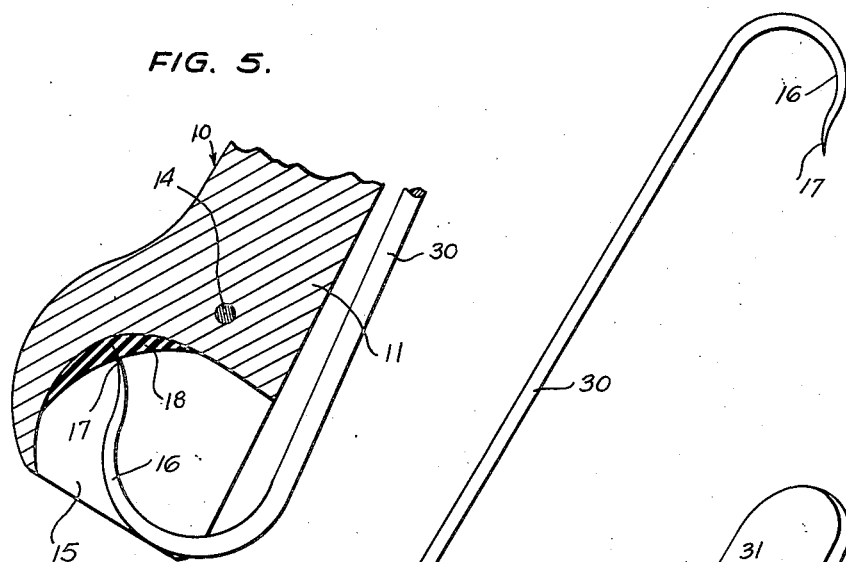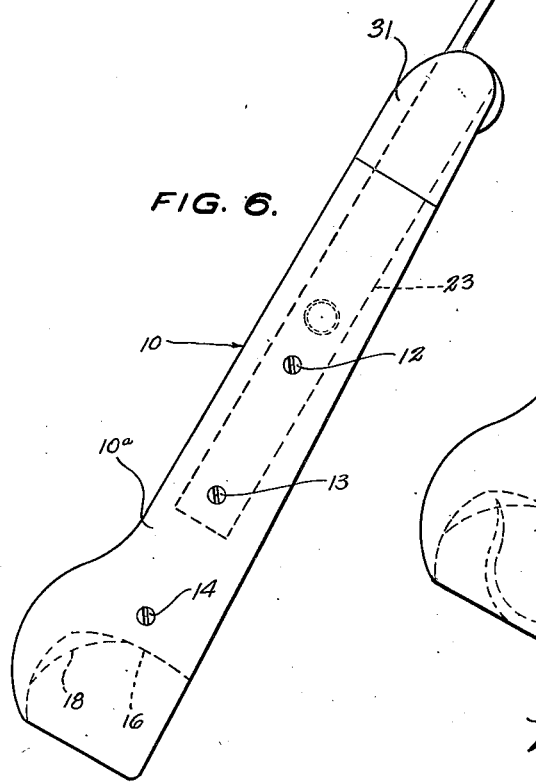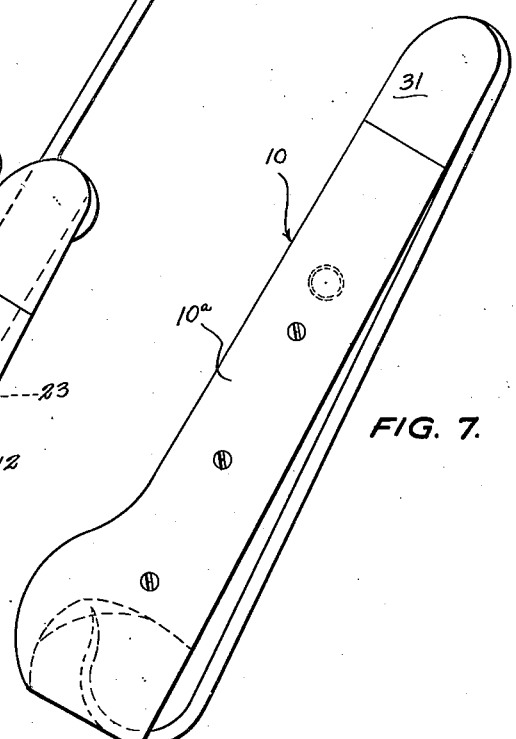

Patented July 1, 1952

2,601,999

UNITED STATES PATENT OFFICE 2,601,999

FOLDABLE GAFF HOOK

Rolla E. Sly, Portland, Oreg.

Application March 12, 1948, Serial No. 14,610

1 Claim. (Cl. 287—99)

This invention relates to a gaff hook.

An object of the invention is the provision of a gaff hook which may be folded so that it may be carried conveniently in a pocket or basket with means for not only concealing the hook but for protecting the sharp point of the hook.

A further object of the invention is the provision of a foldable gaff hook in which a handle for operating the hook when extended functions to house said hook in a protective manner, a lever being employed in connection with a pin and passages in a gearing for the swingable hook for retaining the hook in fixed position when folded or extended, manual means and a spring controlling the release and automatic swinging movement of the hook to an operative position.

The invention will be best understood from a consideration of the following detailed description, in view of the accompanying drawings forming part of the specification, nevertheless, it is to be understood that the invention is not confined to the disclosure, being susceptible of such changes and modifications which shall define no material departure from the salient features of the invention as expressed in the appended claim.

In the drawings:

Figure 1 is a fragmentary vertical longitudinal section of my foldable gaff hook shown extended into an operative position, Figure 2 is a fragmentary vertical longitudinal section of the hook taken at right angles to the section shown in Figure 1, Figure 3 is a fragmentary longitudinal vertical section similar to that shown in Figure 1 but disclosing the hook folded, Figure 4 is a transverse horizontal section along the line 4—4 of Figure 1, Figure 5 is an enlarged fragmentary vertical section of the lower end of the handle showing the hook rested therein.

Figure 6 is a side view of the foldable hook extended to an operative position from the handle, and Figure 7 is a side view of the handle showing the gaff hook folded therein.

Referring more particularly to the drawings, 10 designates a handle which is formed of a well known plastic and which is substantially hollow except for the portion 11 at the lower end. Rivets or screws 12, 13 and 14 connect a cover plate 10a to the handle 10 and serve other purposes which will be explained presently. The rivet 14 is located in the lower solid portion of the handle for aiding in securing the sections of the handle together. A pocket 15 is formed in the solid end of the handle to receive the hook 16 per se while the sharpened point 17 engages a pad 18 formed of sponge rubber.

It will be noted from Figure 1 that the handle has a rear end wall 20 and a front end wall 21 which is tapered lengthwise. The walls provide a narrow longitudinal chamber 22 within the handle.

A channel member 23 is located in the chamber 22 and secured in place by the screws or rivets 12 and 13 and has its open end facing the removable plate 10a. A coil spring 24 has the lower end connected to a pin 25 carried by the channel member. The upper end is attached to an eye 26 on the lower end of a wire cable 27.

A shank 30 of the hook 16 extends through an opening at the upper end of a metal casing 31 which is pressed onto the upper reduced end of the handle 10. This casing is cut away as shown at 32 in Figure 3 in the front and side portions thereof to permit the shank to move from its operative position (Fig. 6) to its inoperative or closed position (Fig. 7).

The shank is formed integrally with a disk 33 providing a hub or trunnion which is rotatably mounted on a pin 34 carried by the side flanges of the channel member 23. The disk is provided with diametrically disposed perforations 36 and 37 for a purpose which will be explained presently. The periphery of the disk has a groove 38, concave in cross-section, for receiving the cable. The cable is attached at 39 to the disk.

A lever 40 is pivoted at 41 on one face of the channel member 23. This lever is slightly bent so that one end 42 is normally spaced from said face by a coil spring 43 (Fig. 2). The outer free end of the lever has a pin 44 disposed above the cut-away portion 32 of the casing 31 and is adapted to be received by one of the perforations 36 or 37 for retaining the gaff hook extended from the handle or folded therein. A button 45 is secured to the lower end 42 of the lever 40 and normally seats in a depression 46 in the handle to prevent accidental actuation of the lever. The ends of the spring 43 are secured respectively to the face 47 of the channel member and to the portion 42 of the lever 40. Said spring is received by a passage in the other face 48 of the channel 23.

A pin 50 secured to the disk 33 projects from opposite faces of the disk and is adapted to engage a straight portion 51 on the upper end of each flange of the U-shaped channel 23 for retaining the gaff hook extended (Figs. 1 and 2). When the hook has been closed the pin 50 will be seated in sockets 52 in the upper ends of the flanges.

The operation of my device is as follows:

When the gaff hook is folded as shown in Figures 3 and 7, it may be placed in the pocket or in a basket. However, when longer sizes are manufactured, the folded gaff hooks may be placed in a case or in the boat. The fact that the hook is seated in the pocket 15 with the point 17 imbedded in the pad 18 will prevent the hook from contacting any parts of the human body or elements of a boat so that the point will be in condition for use.

When it is desired to use the hook, the handle is grasped by the hand of the operator with the end of the handle having the cap or casing 31 pointing outwardly from the body. The thumb of the operator is pressed on the button 45 whence the lever 40 will be rocked and raise the pin 44 out of the perforation 37. The spring 24, which tends to rotate the disk 33 will revolve said disk and thrust the gaff hook to the operative position shown in Figure 6. The pin 44 will fall automatically in the perforation 36 after the rotating disk has brought the perforation in alignment with the pin.

When the work has been completed the shank 30 is returned manually to the position shown in Figure 7, after the button 45 has been depressed to release the pin 44 from the perforation 36 in the disk 33. The spring 24 is under tension when the hook is folded into the handle.

What I claim is:

In a gaff hook, the combination with spaced flanges, a disc carrying a shank rotatably supported between said flanges inwardly of one end thereof, said disc being provided with a pair of circumferentially spaced perforations corresponding to an extended and a retracted position for said shank, and spring means operatively connected to said shank for normally biasing the latter into said extended position, of means selectively engageable with the spaced perforations of said shank for holding the latter in said extended or retracted position, said means comprising a lever arranged in face to face spaced relation with respect to said disc and pivotally mounted intermediate its ends for rocking movement about an axis transverse of and spaced from said disc, a pin projecting transversely from one end of said lever and normally engaging the one of said perforations corresponding to the retracted position of said shank, a coiled spring arranged transversely of said lever adjacent the other end thereof and having one end secured to the face of said lever facing said disc and having the other end secured to a supporting surface for urging the other end outwardly, hand actuable means on the other face of said lever adjacent the other end thereof for moving the other end of said lever inwardly to thereby cause rocking movement of said lever about said axis and disengage said pin from said one of said perforations, and another pin projecting from the opposite faces of said disc and engageable with means on said one end of said flanges for retaining the shank in the extended position.

ROLLA E. SLY.

REFERENCES CITED

The following references are of record in the file of this patent:

UNITED STATES PATENTS

| Number | Name | Date |
|---|---|---|
| 1,639,009 | Singley | Aug. 16, 1927 |
| 2,107,095 | Wagner | Feb. 1, 1938 |
| 2,214,660 | Darling | Sept. 10, 1940 |
| 2,407,897 | Newman | Sept. 17, 1946 |
| 2,461,941 | Sutton | Feb. 15, 1949 |

FOREIGN PATENTS

| Number | Country | Date |
|---|---|---|
| 28,765 | Germany | Oct. 11, 1884 |
| 435,488 | France | Mar. 1, 1912 |